Jan. 29, 1935.  S. RUBEN  1,989,463
ELECTRIC CURRENT RECTIFIER
Filed Nov. 9, 1933
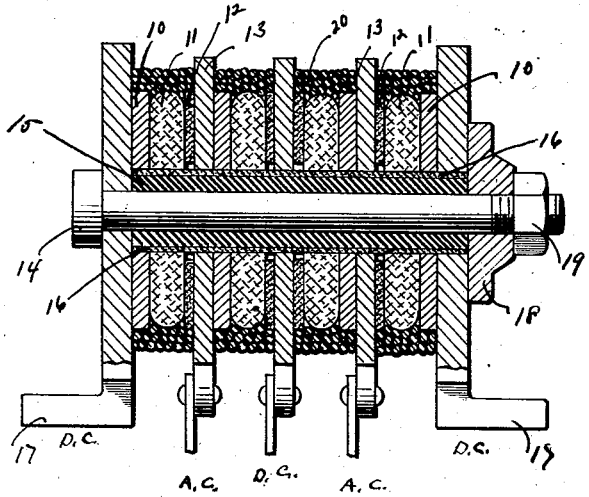
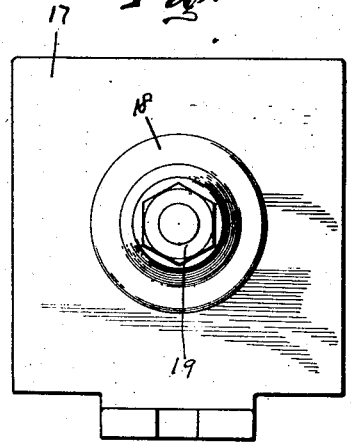
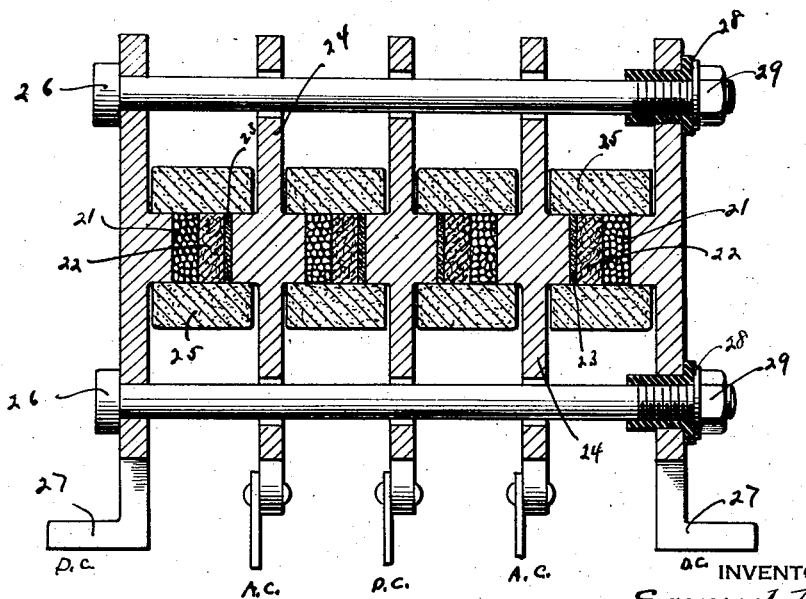
INVENTOR
Samuel Ruben
BY
ATTORNEY Patented Jan. 29, 1935

1,989,463

UNITED STATES PATENT OFFICE 1,989,463

ELECTRIC CURRENT RECTIFIER

Samuel Ruben, New Rochelle, N. Y., assignor to Ruben Rectifier Corporation, Englewood, N. J., a corporation of Delaware Application November 9, 1933, Serial No. 697,288

24 Claims. (Cl. 175—366)

This invention relates to electric current rectifiers and the like which employ asymmetric or unilateral conductive couples of the dry surface contact variety. Specifically, it relates to rectifiers of the type described in my co-pending application S. N. 665,869 filed 13th April 1933 and in my various patents relating to rectifiers such as U. S. Letters Patent 1,751,359.

Generally it may be said that such rectifiers are composed of couples comprising a relatively electropositive electrode element formed from an element chosen from the empirical group of elements including beryllium, magnesium, calcium, zinc and aluminum, in contact with another electrode element having a surface of a relatively electronegative material such as a metal sulphide, selenide or telluride. The electronegative element is one which has inherently reaction properties adapted for the formation and maintenance of an inverse current blocking film at the junction of the electrode elements. Examples of such rectifiers are the magnesium silicide-cupric sulphide rectifier and the magnesium-cupric sulphide rectifier.

An object of this invention is to provide an improved rectifier of the types described having a longer life and affording a more efficient and stable operation.

Another object is to provide such a rectifier having a reserve means for maintaining the rectifying layer which is found at the junction of the rectifier electrodes.

Other objects will be apparent from the disclosure and from the drawing in which Fig. 1 is a sectional view of one structural form of a device of the present invention.

Fig. 2 is an end view of the device depicted in Fig. 1, and

Fig. 3 is a sectional view of another structural modification of the invention.

The present magnesium-cupric sulphide rectifier consists of an electrode of magnesium against a cupric sulphide electrode with the resultant formation of a magnesium sulphide rectifying layer. Cupric sulphide (CuS) and not cuprous sulphide ($Cu_2S$) is used because if $Cu_2S$ is reduced, free copper is formed which must be oxidized by sparking of the unit in order to prevent partial or local short circuiting. Thus, $Mg+Cu_2S=MgS+Cu$. By the use of CuS, this was avoided: $Mg+2CuS=MgS+Cu_2S$.

Rectifier units formed with Mg and CuS, while initially stable and while capable of operating under normal conditions for a satisfactory length of time in an inert atmosphere, were found to eventually increase in internal resistance, with consequent formation of cupric and cuprous oxide. This condition was apparently brought about by the moisture in the atmosphere reacting with the MgS surface: $MgS+H_2O=MgO+H_2S$. Thus an area would become non-conductive due to the formation of the insulating oxide of magnesium and the production of hydrogen sulphide gas, thus causing a reduction of active contacting area. A further reaction tending to increase the internal resistance of the unit might also obtain, that is, should the applied potential discharge or puncture through the magnesium oxide layer, it will tend to reform, in which case we would have a further reduction of $Cu_2S:Mg+Cu_2S=MgS+2Cu$. The current, if intense enough at this localized short circuiting area, would heat the Cu which had been formed and oxidize it to $Cu_2O$ which would raise the internal resistance of the unit and further decrease its active life. If the forming or operating current is not high enough, it is possible to have a leaking or short circuited junction. By sealing the unit against moisture as by dipping in a lacquer or varnish as shown in my U. S. Letters Patent, 1,649,742, the production of $H_2S$ was minimized and the active low internal resistance life of the unit was much increased.

However, when the unit was atmosphere sealed, the higher operating temperature effected by the thermal insulating quality of the protective sealing, caused some oxidation of the sulphide layer.

I have found that by mounting the rectifier couples on a sulphur or sulphurized core that there is at operating temperature a slight sulphur pressure or atmosphere which prevents reduction of the sulphide and maintains the unit at its initially low resistance over an indefinite time. This sulphur atmosphere prevents the production of free copper, which in prior units caused sparking or local short circuits. CuS is formed with the further formation of CuS from $Cu_2S$, as can be observed by the blue appearance of the disc as compared to the black $Cu_2S$ appearance when a sulphur atmosphere is not used. It prevents the rise of internal resistance with life, because it prevents the conversion of the low resistance copper sulphide to the relatively non-conductive copper oxide. For instance, it has been observed that units without a sulphur core or reservoir when operated over a long period, as 5,000 hours continuous operation, have shown as much as 20% increase in internal resistance due to the combined production of magnesium and copper oxide; whereas duplicate units, constructed with a sulphur core reserve have shown no rise in internal resistance during the same period.

In units of lower resistance and higher operating temperature, such as those embodying magnesium-cupric selenide couples, the core tube is coated with selenium, which may be applied by dipping the core, such as a porous ceramic tube, in a carbon disulphide solution of selenium and then heating to evaporate the solvent. Selenium is preferable to sulphur where the operating temperature of the rectifier is in excess of that which the sulphur can withstand. Either the sulphurized or seleniumized core may be used with the sulphide, selenide or telluride type units, the vapor of either selenium or sulphur serving to prevent the formation and maintenance of free copper or copper oxide.

The presence of the sulphur or selenium in vapor form serves also to maintain a low resistance sulphide or other rectifying film, and to repair damage to the film caused by heavy surges or overloads.

The invention has its application in relation to both the magnesium-cupric sulphide and the magnesium silicide-cupric sulphide type rectifiers. These two types may be described briefly as follows: In the former, one electrode is formed from pure magnesium or other electropositive element as described in my patents and oxidized in a suitable manner. The electro-negative electrode element is preferably formed from a sulphide of copper or an alloy thereof such as for example brass. This element may be formed in the known manner of subjecting a metallic disc to the action of sulphur vapors as described in my Patent No. 1,751,460, or a sulphide of the metal may be formed, granulated and pressed into shape. Other sulphide, selenide and telluride compounds as well as other electropositive materials may be used as described in my patents (see U. S. Letters Patent 1,751,361).

In the latter type, the electropositive electrode element may be formed from a silicon material, that is, silicon alone or a compound of silicon and an element chosen from an empirical group of more electropositive elements of the electrochemical table of elements, preferably chosen from the second and third groups of Mendelejeff's periodic table of elements, comprising beryllium, magnesium, calcium, zinc and aluminum. This electropositive electrode element is placed in surface contact with an electronegative electrode element having a high contact resistance with the electropositive electrode element and is preferably formed from, or provided with, a surface of a compound of an element chosen from an empirical group of elements of sub-group B of the sixth periodic group in Mendelejeff's table of elements, comprising sulphur, selenium and tellurium, or a mixture of such compounds. The other constituents of the compound or compounds forming the electronegative material may be of any suitable metal or alloy thereof chosen from an empirical group of metals or materials comprising copper, silver, brass and bronzes.

The electropositive electrode element is preferably formed from granular magnesium silicide. The electronegative electrode material in many instances is formed from a solid cupric sulphide disc but a more preferable disc material is a mixture of cupric sulphide and cupric selenide. The electronegative electrode may also be in granular form.

For some uses, the magnesium silicide cathode unit is preferable to the magnesium cathode type as it will stand higher A. C. voltage per section.

One of the fundamental requirements in the formation of a rectifying junction is the maintenance of an energy loss at the junction ample to satisfy the requirements for the formation of the rectifying film, for instance, magnesium sulphide. In order to obviate the necessity of excessive current densities to produce this film, which current densities might involve localized effects such as pitting of electrodes, the contact resistance of the magnesium is increased by producing a thin oxide layer on its surface. Where a silicide is used, however, its high specific resistance makes such a procedure unnecessary.

In order to describe in detail the construction of two embodiments of the invention, reference is made to the drawing.

In Fig. 1, in which is shown a full wave rectifier, the electropositive electrode element 10 consists of any suitable electropositive material such as for example aluminum, magnesium which has been slightly oxidized, or an alloy or amalgam thereof, etc. This electrode element is preferably in the form of a washer and lies in face engagement with the electronegative electrode element 11 of any suitable electronegative material, such as, cupric sulphide, or a sulphided brass body. A layer 12 of non-polarizing substance such as carbonized nickel, is placed in contact with the opposite face of the electronegative electrode element 11 and itself contacts copper radiators 13. When these elements are in the form of washers, they may be readily assembled upon a bolt 14 provided with a porous insulating ceramic collar 15 having a surface of sulphur 16 produced by dipping the ceramic collar or tube in molten sulphur. Or, a molded sulphur tube may be used in place of the sulphur coated ceramic where the heat will permit its use. Such a molded sulphur tube may be formed from a mixture of sulphur and aluminum oxide to insure greater strength. The unit is assembled with end plates 17 and is maintained under pressure by spring washer 18 and nut 19. The rectifying couples are sealed from moisture by impregnated twine winding 20.

In Fig. 2, like numbers indicate like parts.

In Fig. 3, in which is also shown a full wave rectifier, the rectifier couple consisting of compressed magnesium silicide granules 21 lies in face engagement with a solid disc of cupric sulphide 22 or other suitable electronegative material. A disc of carbonized nickel 23 is placed in contact with the opposite face of the cupric sulphide disc in order to prevent polarization with contacting radiating member 24. The rectifier couple is housed in a porous ceramic tube 25 which has been dipped in and saturated with molten sulphur. In this way, a sulphur reservoir, similar to the sulphur coated tube 15-16 of Fig. 1 is provided and the rectifier couple is also thereby sealed. Bolts 26 pass through end plates 27 which in co-operation with spring washer 28 and nut 29 maintain the unit under desired pressure.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. In electric current rectifiers and the like, of the dry surface variety, a unilaterally conductive couple comprising a relatively electropositive electrode, another electrode having a surface of a relatively electronegative material of at least one compound of at least one element chosen from the empirical group of elements including sulphur, selenium and tellurium in contact with said electropositive electrode; a cooperating member, not forming a part of the rectifier conductive path, containing at least one of the elements sulphur and selenium in elemental form and adapted to supply one of said elements in vapor form to said rectifying couple during operation of the rectifier.

2. In electric current rectifiers and the like, of the dry surface variety, a unilaterally conductive couple comprising a relatively electropositive electrode, another electrode having a surface of a relatively electronegative material of at least one compound of at least one element chosen from the empirical group of elements including sulphur, selenium and tellurium in contact with said electropositive electrode, said electronegative electrode having inherently reaction properties adapted for the formation and maintenance of an inverse current blocking film at the junction of the electrode elements, a cooperating member, not forming a part of the rectifier conductive path, containing at least one of the elements sulphur and selenium in elemental form and adapted to supply one of said elements in vapor form to said rectifying couple during operation of the rectifier.

3. In electric current rectifiers and the like, of the dry surface variety, a unilaterally conductive couple comprising a relatively electropositive electrode formed from an element chosen from the empirical group of elements including beryllium, magnesium, calcium, zinc and aluminum, another electrode having a surface of a relatively electronegative material of at least one compound of at least one element chosen from the empirical group of elements including sulphur, selenium, and tellurium in contact with said electropositive electrode, a cooperating member not forming a part of the rectifier conductive path, containing at least one of the elements sulphur and selenium in elemental form and adapted to supply one of said elements in vapor form to said rectifying couple during operation of the rectifier.

4. In electric current rectifiers and the like, of the dry surface variety, a unilaterally conductive couple comprising an electrode composed of magnesium, another electrode having a surface of a relatively electronegative material of at least one compound of at least one element chosen from the empirical group of elements including sulphur, selenium, and tellurium in contact with said electropositive electrode, a cooperating member, not forming a part of the rectifier conductive path, containing at least one of the elements sulphur and selenium in elemental form and adapted to supply one of said elements in vapor form to said rectifying couple during operation of the rectifier.

5. In electric current rectifiers and the like, of the dry surface variety, a unilaterally conductive couple comprising an electrode composed of a compound of silicon with one of the elements beryllium, magnesium, calcium, zinc and aluminum, another electrode having a surface of a relatively electronegative material of at least one compound of at least one element chosen from the empirical group of elements including sulphur, selenium, and tellurium in contact with said electropositive electrode, a cooperating member, not forming a part of the rectifier conductive path, containing at least one of the elements sulphur and selenium in elemental form and adapted to supply one of said elements in vapor form to said rectifying couple during operation of the rectifier.

6. In electric current rectifiers and the like, of the dry surface variety, a unilaterally conductive couple comprising a relatively electropositive electrode, another electrode composed of cupric sulphide in contact with said electropositive electrode, a cooperating member containing sulphur in elemental form and adapted to supply sulphur in vapor form to said rectifying couple during operation of the rectifier.

7. In electric current rectifiers and the like, of the dry surface variety, a unilaterally conductive couple comprising a relatively electropositive electrode, another electrode composed of cupric selenide in contact with said electropositive electrode, a cooperating member containing selenium in elemental form and adapted to supply selenium in vapor form to said rectifying couple during operation of the rectifier.

8. In electric current rectifiers and the like, of the dry surface variety, a unilaterally conductive couple comprising an electrode, composed of magnesium, an electrode of cupric sulphide in contact therewith, a cooperating member containing sulphur in elemental form and adapted to supply sulphur in vapor form to said couple during operation of the rectifier.

9. In electric current rectifiers and the like of the dry surface variety, a unilaterally conductive couple comprising a relatively electropositive electrode composed of magnesium, an electrode of cupric selenide in contact therewith, a cooperating member containing selenium, in elemental form and adapted to supply selenium in vapor form to said couple during operation of the rectifier.

10. In electric current rectifiers and the like of the dry surface variety, a unilaterally conductive couple comprising an electrode composed of magnesium silicide, an electrode of cupric sulphide in contact therewith, and a cooperating member containing sulphur in elemental form and adapted to supply sulphur in vapor form to said couple during operation of the rectifier.

11. In electric current rectifier couples and the like having a rectifying film composed of a metallic compound of one of the elements sulphur, selenium and tellurium, a reservoir adjacent said couple but not forming a part thereof adapted to supply one of the elements sulphur and selenium in vapor form to said rectifying film during operation of the rectifier.

12. In electric current rectifier couples and the like having a rectifying film composed of a metallic sulphide film, a reservoir member adjacent said couple but not forming a part thereof, adapted to supply sulphur in vapor form to said rectifying film during operation of the rectifier.

13. In electric current rectifier couples and the like having a rectifying film composed of a metallic selenide film, a reservoir member adjacent said couple but not forming a part thereof adapted to supply selenium in vapor form to said rectifying film during operation of the rectifier.

14. An alternating current rectifier of the type employing a rectifying film composed of a metallic compound of one of the elements sulphur, selenium and tellurium, comprising a plurality of contacting rectifying couples enclosing a substantially non-conductive core having a surface layer of one of the elements sulphur and selenium.

15. An alternating current rectifier of the type employing a sulphide rectifying film, comprising a plurality of contacting rectifying couples each containing a rectifying film of magnesium sulphide, said couples being mounted under pressure in cooperation with a member containing sulphur in elemental form, said member not forming a part of the rectifier conductive path.

16. An alternating current rectifier of the type employing a selenide rectifying film, comprising a plurality of contacting rectifying couples each containing a rectifying film of magnesium selenide, said couples being mounted under pressure in cooperation with a member containing selenium in elemental form, said member not forming a part of the rectifier conductive path.

17. An alternating current rectifier couple of the type employing a silicide cathode and an anode of a compound of one of the elements sulphur, selenium and tellurium, said electrodes having mounted in cooperation therewith a member containing in elemental form one of the elements sulphur and selenium, said member not forming a part of the rectifier conductive path but being adapted to supply one of the elements sulphur and selenium in vapor form to said couple.

18. An alternating current rectifier couple of the type employing a rectifying film of a compound of one of the elements sulphur, selenium and tellurium, having enclosed therewithin a member not forming a part of the rectifier couple containing one of the elements sulphur and selenium in elemental form.

19. An alternating current rectifier couple of the type employing a rectifying film of a compound of one of the elements sulphur, selenium and tellurium, means within the rectifier not forming a part of the rectifier couple comprising sulphur in elemental form, for providing an internal sulphur atmosphere.

20. An alternating current rectifier couple of the type employing a rectifying film of a compound of one of the elements sulphur, selenium and tellurium, means within the rectifier not forming a part of the rectifier couple comprising selenium in elemental form, for providing an internal selenium atmosphere.

21. In electric current rectifier couples and the like having a rectifying film composed of a metallic compound of one of the elements sulphur, selenium and tellurium, a reservoir adjacent said couple but not forming a part thereof adapted to supply one of the elements sulphur and selenium in vapor form to said rectifying film during operation of the rectifier and a moisture proof sealing means over said couple.

22. In electric current rectifiers and the like, of the dry surface variety, a unilaterally conductive couple comprising a relatively electropositive electrode, another electrode having a surface of a relatively electronegative material of at least one compound of at least one element chosen from the empirical group of elements including sulphur, selenium and tellurium in contact with said electropositive electrode; an additional and cooperating member containing at least one of the elements sulphur and selenium in elemental form and adapted to supply one of said elements in vapor form to said rectifying couple during operation of the rectifier and a moisture proof sealing means over said couple.

23. An alternating current rectifier of the type employing a rectifying film of a compound of one of the elements sulphur, selenium and tellurium, having enclosed therewithin a member not forming a part of the rectifier electrodes, containing one of the elements sulphur and selenium in elemental form and a moisture proof sealing means covering said rectifying film.

24. An alternating current rectifier of the type employing a rectifying film composed of a metallic compound of one of the elements sulphur, selenium, and tellurium, comprising a plurality of contacting rectifying couples enclosing a substantially non-conductive core having a surface layer of one of the elements sulphur and selenium, and a moisture proof sealing means covering said rectifying couples.

SAMUEL RUBEN.